United States Patent Office 2,938,529
Patented May 31, 1960

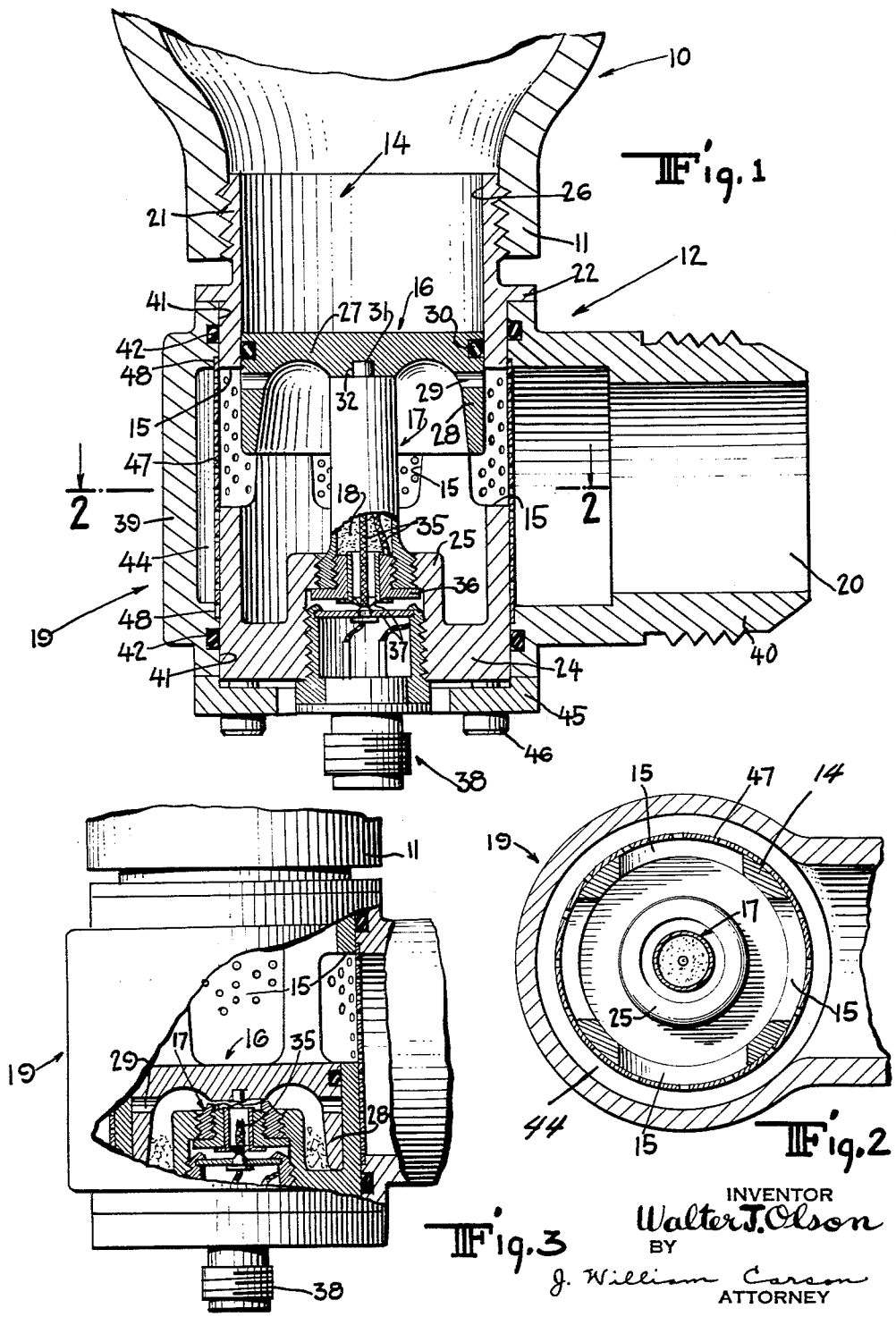

2,938,529

VALVE FOR CONFINING FLUID UNDER PRESSURE

Walter J. Olson, Bloomfield, N.J., assignor to Specialties Development Corporation, Belleville, N.J., a corporation of New Jersey Filed Nov. 6, 1958, Ser. No. 772,246

8 Claims. (Cl. 137—68)

The present invention relates to valves for confining fluids such as fire extinguishing liquids under pressure in a receptacle, and, more particularly, to such a valve which is explosively actuated to release the fluid from the receptacle.

The primary objects of the present invention are to provide such valves which are constructed of a minimum number of simple parts adapted to be manufactured and assembled in an economical manner, are rapid in operation and are readily reloaded for subsequent operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

Fig. 1 is a longitudinal sectional view of a valve in accordance with the present invention, a portion of the receptacle to which the valve is attached to confine fluid under pressure therein being shown.

Fig. 2 is a sectional view taken along the line 2—2 on Fig. 1.

Fig. 3 is a view similar to Fig. 1 with the valve in its actuated position to release the fluid from the receptacle.

Referring to Figs. 1 and 2 of the drawing in detail there is shown a portion of a receptacle 10 for storing a fire extinguishing fluid such as methyl bromide, chlorobromomethane and the like pressurized by an inert gas such as nitrogen, a threaded outlet 11 at the lower end of the receptacle so that a syphon tube can be dispensed with, and a valve 12 secured to the receptacle at the outlet.

The valve generally comprises a housing 14 having side opening means 15, a piston 16 in the housing for establishing communication between the receptacle and the opening means, a stem 17 for positioning the piston to confine the fluid in the receptacle, explosively actuated means 18 for disintegrating the stem, and a body 19 surrounding the housing formed with a discharge outlet 20 in flow communication with the side opening means.

The housing 14 is a generally tubular member which comprises a threaded open upper end 21 secured into the receptacle outlet 11, an external flange 22 just below the opening end, a plurality of circumferentially spaced side openings below the flange providing the opening means 15, a lower end wall 24 formed with an internal central boss 25, and a bore 26 extending from the upper end to the wall 24.

The piston 16 is an inverted cup-shaped member which is slidably disposed in the bore 26 and comprises an end wall 27, a side wall 28, and apertures 29 in the side wall adjacent the end wall. The piston carries a gasket 30 to provide a seal between its side wall and the housing bore 26.

The stem 17 is a tubular member formed of disintegratable material which is sufficiently strong to withstand the force exerted on it by the piston. The stem is dimensioned to position the piston in the bore with the end wall 27 of the piston between the upper end of the bore and the side openings 15, preferably closer to the side openings so that the apertures 29 are normally in registry with the side openings. The lower end of the stem is threaded into the upper end of the boss 25, and the upper end of the stem has a projection 31 extending into a central recess 32 of the lower side of the piston end wall 27.

Preferably, the stem 17 contains the explosively actuated means 18 such as a charge of explosive substance or a squib, and is provided with fuse wires 35 and an end closure 36 having electrical contacts 37. Suitable connector means 38 for establishing an electrical connection with the fuse wire contacts are threaded or otherwise secured into the lower end of the boss 25 from the exterior of the housing end wall 24 whereby this end of the housing is closed.

The body 19 comprises a generally cylindrical section 39, and a tubular discharge outlet section 40 formed with the outlet 20 and radially disposed with respect to the axis of the section 39. The section 39 has a bore 41 at each end for receiving the ends of the housing and each bore has a gasket 42 therein for providing a seal between the body and the housing. The section 39 also has a generally circular passageway 44 which partly surrounds the side openings 15 of the housing and communicates with the outlet 20 of the section 40.

The upper end of the body abuts the flange 22 of the housing and the lower end of the body abuts a ring 45 which is secured to the wall 24 of the housing by screws 46.

A cylindrical screen 47 surrounds the housing 14 to prevent particles of the disintegrated stem from passing through the opening 15 and entering the passageway 44. The ends of the screen are positioned in an annular recess 48 formed in each of the body portions adjacent the passageway 44, whereby the ends of the screen are retained between the housing and the body.

In operation, the valve parts are in the position as shown in Figs. 1 and 2 while the fluid is confined in the receptacle. In order to cause the fluid to be discharged, electrical current is caused to flow through the fuse wires 35 to heat the same and cause the explosive substance to ignite and disintegrate the stem 17.

When the stem is blown to bits, support for the piston 16 is removed and the piston is moved downwardly by the pressure of the fluid to the position shown in Fig. 3. As this occurs, the piston apertures 29 remain in registry with the housing side openings 15 for a sufficient duration to vent pressure between the piston and the housing end wall 24 to the discharge outlet 20, and, enable the lower end of the piston side wall 28 to contact the end wall 24, whereupon the apertures 29 are closed by the wall of the housing providing the bore 26 so that the debris of the stem and the fuse wires is trapped between the cup-shaped piston and the housing end wall 24. Any debris which may escape while the apertures serve as vents is blocked by the screen 47 and cannot enter the discharge outlet.

When the piston is in its lower position as shown in Fig. 3, the end wall 27 of the piston is below the openings 15 to fully open the valve, whereby the fluid in the receptacle flows through the opening at the right directly into the discharge outlet and flows through the other openings into the passageway 44 and then into the discharge outlet (Fig. 2).

After discharge has taken place, the electrical connector 38 and the ring 45 are removed. This enables the valve to be taken apart to thoroughly clean the interior and to remove the end closure 36 of the explosively actuated means and any pieces still attached thereto. The valve is reassembled, and the piston is then reset by inserting another stem (Fig. 1). The receptacle is recharged and pressurized through a filling opening (not shown) at its upper end.

From the foregoing description, it will be seen that the present invention provides an improved explosively actuated valve which is simple and practical in construction, reliable in operation and is readily reloaded.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A valve for confining fluid under pressure comprising a housing having a closed end and an open end constituting an inlet for the fluid and having a bore between said ends provided with side opening means constituting an outlet for the fluid, a piston slidably disposed in said bore, a disintegratable stem disposed in said bore between said closed housing end and said piston for positioning said piston in said bore between said side opening means and said open housing end to close the valve, and explosive means for disintegrating said stem, whereby the pressure of the fluid at said open housing end is adapted to move said piston towards said closed housing end and past said opening means to fully open the valve and establish fluid flow communication between the inlet and the outlet.

2. A valve for confining fluid under pressure comprising a housing having a closed end and an open end constituting an inlet for the fluid and having a bore between said ends provided with side opening means constituting an outlet for the fluid, a piston slidably disposed in said bore, a disintegratable stem disposed in said bore between said closed housing end and said piston for positioning said piston in said bore between said side opening means and said open housing end but nearer said opening means to close the valve, and explosive means for disintegrating said stem, whereby the pressure of the fluid at said open housing end is adapted to move said piston towards said closed housing end and past said opening means to fully open the valve and establish fluid flow communication between the inlet and the outlet, said piston having aperture means normally in registry with said side opening means and in registry therewith during initial movement of said piston to vent pressure between said piston and said closed housing end.

3. A valve for confining fluid under pressure comprising a tubular housing having a closed lower end and an open upper end constituting an inlet for the fluid and having a bore between said ends provided with a side opening at its upper end constituting the outlet for the fluid, an inverted cup-shaped piston slidably disposed in said bore, having an end wall and a side wall provided with an aperture, a disintegratable stem disposed in said bore between said closed housing end and said piston for positioning said piston in said bore between said side opening and said open housing end to close the valve with said aperture in registry with said opening, and explosive means for disintegrating said stem, whereby the pressure of the fluid at said open housing end is adapted to move said piston towards said closed housing end and past said side opening to fully open the valve and establish fluid flow communication between the inlet and the outlet said aperture serving to vent the space between said piston and said closed housing end during initial operation of said piston and the wall of said housing serving to close said aperture when said piston has moved past said side opening so that the debris of said stem and explosive means is trapped by said piston.

4. A valve for confining fluid under pressure comprising a tubular housing having a closed lower end and an open upper end constituting an inlet for the fluid and having a bore between said ends provided with a side opening at its upper end constituting the outlet for the fluid, an inverted cup-shaped piston slidably disposed in said bore having an end wall and a side wall provided with an aperture, a screen covering said side opening, a disintegratable stem disposed in said bore between said closed housing end and said piston for positioning said piston in said bore between said side opening and said open housing end to close the valve with said aperture in registry with said opening, and explosive means for disintegrating said stem, whereby the pressure of the fluid at said open housing end is adapted to move said piston towards said closed housing end and past said side opening to fully open the valve and establish fluid flow communication between the inlet and the outlet, said aperture serving to vent the space between said piston and said closed housing end during initial operation of said piston and the wall of said housing serving to close said aperture when said piston has moved past said side opening so that the debris of said stem and explosive means is trapped by said piston.

5. A valve for confining fluid under pressure comprising a housing having a closed end and an open end constituting an inlet for the fluid and having a bore between said ends provided with side opening means constituting an outlet for the fluid, a piston slidably disposed in said bore, a body having a discharge outlet and a passageway surrounding said side opening means in communication with said discharge outlet, a disintegratable stem disposed in said bore between said closed housing end and said piston for positioning said piston in said bore between said side opening means and said open housing end to close the valve, and explosive means for disintegrating said stem, whereby the pressure of the fluid at said open housing end is adapted to move said piston towards said closed housing end and past said opening means to fully open the valve and establish fluid flow communication between the inlet and the outlets.

6. A valve for confining fluid under pressure comprising a housing having a closed end and an open end constituting an inlet for the fluid and having a bore between said ends provided with side opening means constituting an outlet for the fluid, a piston slidably disposed in said bore, a body having a discharge outlet and a passageway surrounding said side opening means in communication with said discharge outlet, a screen between said side opening means and said discharge outlet and said passageway positioned to cover said side opening means, a disintegratable stem disposed in said bore between said closed housing end and said piston for positioning said piston in said bore between said side opening means and said open housing end to close the valve, and explosive means for disintegrating said stem, whereby the pressure of the fluid at said open housing end is adapted to move said piston towards said closed housing end and past said opening means to fully open the valve and establish fluid flow communication between the inlet and the outlets.

7. A valve for confining fluid under pressure comprising a tubular housing having a closed end and an open end constituting an inlet for the fluid and having a bore between said ends provided with side openings constituting the outlet for the fluid, a piston slidably disposed in said bore, a body having a bore at each end for receiving the end portions of said housing and having a passageway surrounding said side openings formed with a discharge outlet, means for securing said housing and said body together, a disintegratable stem disposed in said bore between said closed housing end and said piston for positioning said piston in said bore between said side openings and said open housing end to close the valve, and explosive means for disintegrating said stem, whereby the pressure of the fluid at said open housing end is adapted to move said piston towards said closed housing end and past said openings to fully open the valve and establish fluid flow communication between the inlet and the outlets.

8. A valve for confining fluid under pressure comprising a tubular housing having a closed end and an open end constituting an inlet for the fluid and having a bore between said ends provided with side openings constituting the outlet for the fluid, a piston slidably disposed in said bore, a body having a bore at each end for receiving the end portions of said housing and having a passageway surrounding said side openings formed with a discharge outlet, means for securing said housing and said body together, a tubular screen surrounding said housing having its ends secured between said housing and said body bores, a disintegratable stem disposed in said bore between said closed housing end and said piston for positioning said piston in said bore between said side openings and said open housing end to close the valve, and explosive means for disintegrating said stem, whereby the pressure of the fluid at said open housing end is adapted to move said piston towards said closed housing end and past said openings to fully open the valve and establish fluid flow communication between the inlet and the outlets.

References Cited in the file of this patent

UNITED STATES PATENTS

| | | |
|---|---|---|
| 2,436,364 | McDowell | Feb. 17, 1948 |
| 2,620,815 | Margraf et al. | Dec. 9, 1952 |
| 2,713,391 | Buckholtz | July 19, 1955 |
| 2,730,179 | Ferguson | Jan. 10, 1956 |